United States Patent
Gartside et al.

(10) Patent No.: US 8,656,502 B2
(45) Date of Patent: Feb. 18, 2014

(54) CONTROLLING USE OF A COMPUTER PROGRAM INSTALLED ON A COMPUTER

(75) Inventors: Paul Nicholas Gartside, Milton Keynes (GB); Mark Harris, Banbury (GB)

(73) Assignee: McAfee, Inc., Santa Clara, CA (US)

( * ) Notice: Subject to any disclaimer, the term of this patent is extended or adjusted under 35 U.S.C. 154(b) by 2227 days.

(21) Appl. No.: 10/115,021

(22) Filed: Apr. 4, 2002

(65) Prior Publication Data

US 2003/0191958 A1 Oct. 9, 2003

(51) Int. Cl.
*G06F 21/00* (2013.01)

(52) U.S. Cl.
USPC ............................................. 726/27; 705/59

(58) Field of Classification Search
None
See application file for complete search history.

(56) References Cited

U.S. PATENT DOCUMENTS

| | | | | |
|---|---|---|---|---|
| 5,103,476 A * | 4/1992 | Waite et al. | ...................... | 705/59 |
| 5,490,216 A * | 2/1996 | Richardson, III | ............... | 705/59 |
| 5,790,796 A | 8/1998 | Sadowsky | | |
| 5,948,104 A | 9/1999 | Gluck et al. | | |
| 5,987,610 A | 11/1999 | Franczek et al. | | |
| 6,009,401 A * | 12/1999 | Horstmann | ........................ | 705/1 |
| 6,023,766 A * | 2/2000 | Yamamura | ....................... | 726/29 |
| 6,073,142 A | 6/2000 | Geiger et al. | | |
| 6,108,420 A * | 8/2000 | Larose et al. | ................... | 705/59 |
| 6,169,976 B1 * | 1/2001 | Colosso | ............................ | 705/59 |
| 6,212,635 B1 * | 4/2001 | Reardon | ....................... | 713/165 |
| 6,253,258 B1 | 6/2001 | Cohen | | |
| 6,256,773 B1 * | 7/2001 | Bowman-Amuah | .......... | 717/121 |
| 6,314,409 B2 * | 11/2001 | Schneck et al. | .................. | 705/54 |
| 6,324,649 B1 * | 11/2001 | Eyres et al. | ......................... | 726/5 |
| 6,370,573 B1 * | 4/2002 | Bowman-Amuah | .......... | 709/223 |
| 6,460,050 B1 | 10/2002 | Pace et al. | | |
| 6,557,105 B1 * | 4/2003 | Tardo et al. | .................... | 713/193 |
| 6,694,434 B1 * | 2/2004 | McGee et al. | ................. | 713/189 |
| 6,763,458 B1 * | 7/2004 | Watanabe et al. | .............. | 713/100 |
| 6,799,277 B2 * | 9/2004 | Colvin | ............................. | 726/22 |
| 6,889,212 B1 * | 5/2005 | Wang et al. | ...................... | 705/59 |
| 6,920,567 B1 * | 7/2005 | Doherty et al. | .................. | 726/22 |
| 7,110,984 B1 * | 9/2006 | Spagna et al. | .................... | 705/57 |
| 7,120,429 B2 * | 10/2006 | Minear et al. | .................. | 455/419 |
| 7,506,155 B1 | 3/2009 | Stewart et al. | | |
| 2002/0120578 A1 * | 8/2002 | Sy | ................................... | 705/59 |
| 2003/0023866 A1 * | 1/2003 | Hinchliffe et al. | ............. | 713/200 |
| 2003/0055962 A1 * | 3/2003 | Freund et al. | .................. | 709/225 |
| 2003/0120611 A1 * | 6/2003 | Yoshino et al. | .................. | 705/67 |
| 2004/0054678 A1 * | 3/2004 | Okamoto et al. | ............. | 707/100 |

OTHER PUBLICATIONS

Fink, G.A.; Chappell, B.L.; Turner, T.G.; O'Donoghue, K.F. A Metrics-Based Approach to Intrusion Detection System Evaluation for Distributed Real-Time Systems. Proceedings IPDPS 2002. Pub. Date: 2002 Found on the World Wide Web at: http://ieeexplore.ieee.org/stamp/stamp.jsp?tp=&arnumber=1016475.*

* cited by examiner

Primary Examiner — Nathan Flynn
Assistant Examiner — Jeremiah Avery
(74) Attorney, Agent, or Firm — Patent Capital Group

(57) ABSTRACT

A product update is used to add a licensing control mechanism to an installed computer program. The computer program is preferably a malware scanner or other program which requires regular product updating in order to remain effective in its normal functionality.

21 Claims, 5 Drawing Sheets

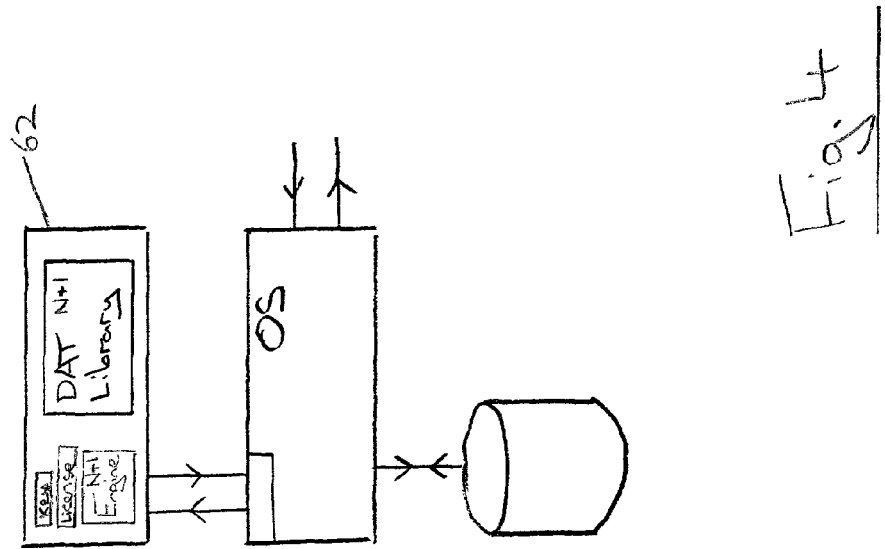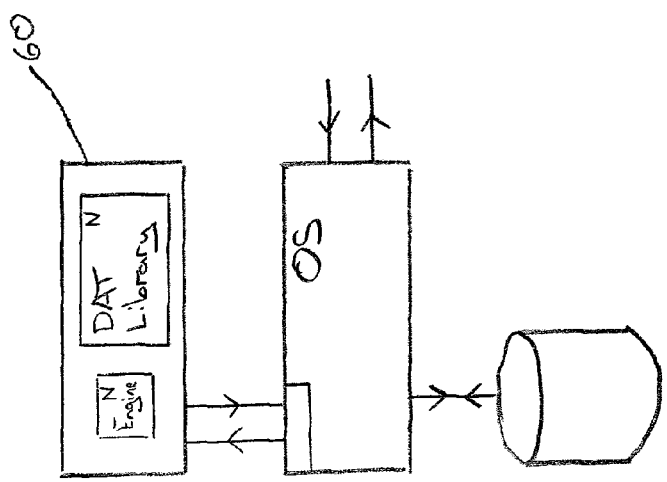
Fig. 4

CONTROLLING USE OF A COMPUTER PROGRAM INSTALLED ON A COMPUTER

BACKGROUND OF THE INVENTION

1. Field of the Invention

This invention relates to the field of data processing systems. More particularly, this invention relates to the field of controlling use of a computer program with a licence key.

2. Description of the Prior Art

It is known to provide computer programs that when they are installed require the user to enter licence key data which is validated with a predetermined metric before use of the computer program is allowed. The licence key data may be supplied together with the media upon which the computer program was supplied. Alternatively, a user may contact the computer program provider, such as via the internet, to register the product and obtain a licence key at that time.

Whilst the above may be effective preventing unlicensed use, a problem exists in respect of existing installed software without such use control mechanisms. The loss of revenue resulting from the unlicensed use of such existing software is highly significant.

SUMMARY OF THE INVENTION

Viewed from one aspect the present invention provides a computer program product for controlling use of a computer program installed on a computer, said computer program product comprising:
a product update for installation at said computer;
wherein said product update serves to add a licensing control mechanism to said computer program installed on said computer, said licensing control mechanism being responsive to license key data to indicate that said computer program is licensed.

The invention recognises that it is becoming increasingly common and accepted that a user will regularly apply product updates to an installed computer program. These product updates are provided for a variety of different reasons, such as to fix newly discovered bugs or cure security vulnerabilities in installed computer programs. This product update route may be used to retrospectively add licensing control mechanisms to an already installed computer program. A user is motivated to apply a product update in order to benefit from the bug fixes and the like provided by that product update and at the same time the computer program provider may benefit from the ability to add a licensing control mechanism to existing installed copies of a computer program which do not have such a mechanism.

This technique is particularly advantageous when the computer program and product updates are of a nature where the product updates will normally be regularly applied by a user in order to maintain the continued effective provision of existing functionality of a computer program. One example of such a combination would be a payroll computer program in which periodic product updates are provided and need to be applied in order to take account of changes in the surrounding tax provisions and other financial regulations. If the payroll program is to continue to operate effectively, then these product updates must be regularly applied and accordingly the product update may be highly effectively used to distribute and apply a licensing control mechanism to a computer program that did not already have such a mechanism.

A further example of a situation in which the present technique is particularly advantageous is where the computer program is a malware scanner, such as a malware scanner that scans for computer viruses, worms, Trojans, banned files, banned words, banned images and the like. In order to provide effective malware protection such malware scanners must be regularly and methodically updated in order to have the latest scanner engines and malware definition data available for detecting and dealing with new malware threats as they are released and encountered. If a user does not apply the product updates, then the protection afforded by the malware scanner will decrease in effectiveness, particularly as the most dangerous malware threats tend to be the newly released items of malware which will only be detected by the latest malware definition data and scanner engines.

Whilst it is possible for the product update to be distributed in a wide variety of different ways, such as via physical media, the invention is particularly well suited to situations in which the product update is received via a network connection, such as via the internet being downloaded from the computer program provider's website. The increased availability of network connections via the internet has made the provision of product updates much easier and more routine and has generally lead to the more widespread practice of users regularly seeking and applying product updates to their computer programs which are already installed.

The effectiveness of the licensing control mechanisms are improved in embodiments in which the user is requested to enter licence key data each time the computer program is started, or at a periodic interval whilst the computer program is running. The licensing control mechanism may also preferably disable the computer program if a licence key is not entered within a predetermined period, such as a fixed number of days from the installation of the licensing control mechanism or a fixed number of starts of the computer program or the like.

Viewed from other aspects the invention provides a method of controlling the use of a computer program and an apparatus for controlling the use of a computer program in accordance with the above described techniques.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically illustrates the updating of a malware scanner with a product update.

DESCRIPTION OF THE PREFERRED EMBODIMENTS

Figure 1:
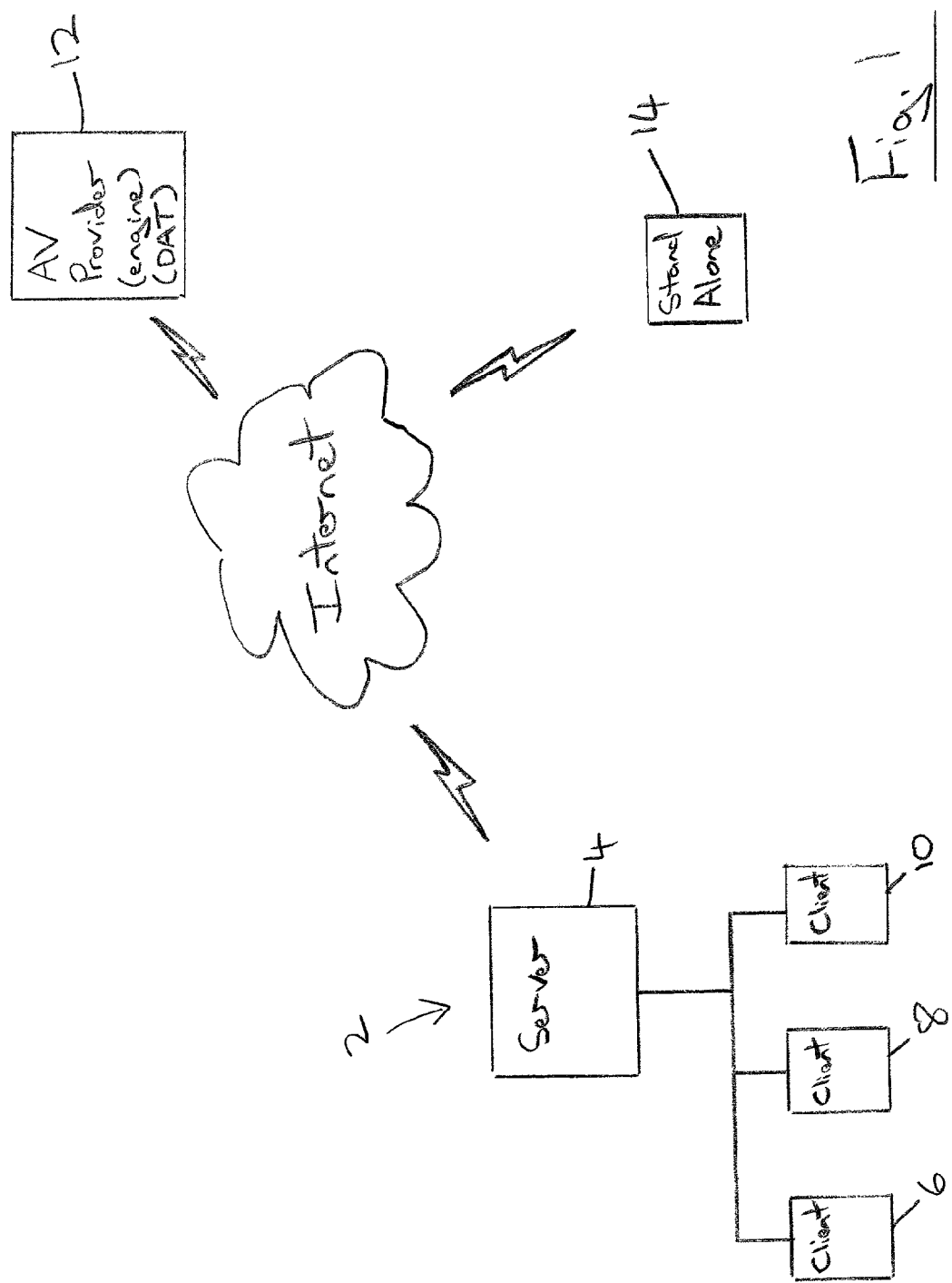
FIG. 1 schematically illustrates a network of computers and a stand alone computer connected via the internet to a web server of a computer program provider.

FIG. 1 illustrates a network 2 comprising a server 4 and a plurality of clients 6, 8, 10 connected to the server 4. The server 4 is in turn connected via the internet to the web server 12 of a computer program provider, such as an anti-virus scanner computer program provider (malware scanner provider). A stand alone computer 14, such as a home user's computer, is also connected via the internet to the web server 12.

The various computers 4, 6, 8, 10 within the network 2 may all use and malware scanning computer program which incorporates a scanning engine and malware definition data which is kept updated by downloading product updates including the scanner engine, the malware definition data or a combination of both from the web server 12. This update procedure may in some circumstances be automated. The stand alone computer 14 also operates the malware scanning computer program and will download the product updates from the web server 12 in accordance with its own requirements.

It will be appreciated that a malware scanning computer program must regularly be updated with product updates in order to remain effective since the latest virus definition data is required in order to protect against newly released items of malware. If a user does not download the product updates, then the malware scanner will progressively become less and less effective as the number of items of malware against which it does not provide protection will steadily increase. This situation is made worse as the items of malware that often provide the greatest threat are those most recently released and which require the latest versions of the product updates in order to be detected.

The regular, and possibly automated, download of product updates may be used by the computer program provider to distribute and apply a licensing control mechanism retrospectively to installed versions of their computer program which do not already have such a mechanism. Preventing unlicensed use of their computer program is highly commercially advantageous.

Figure 2:
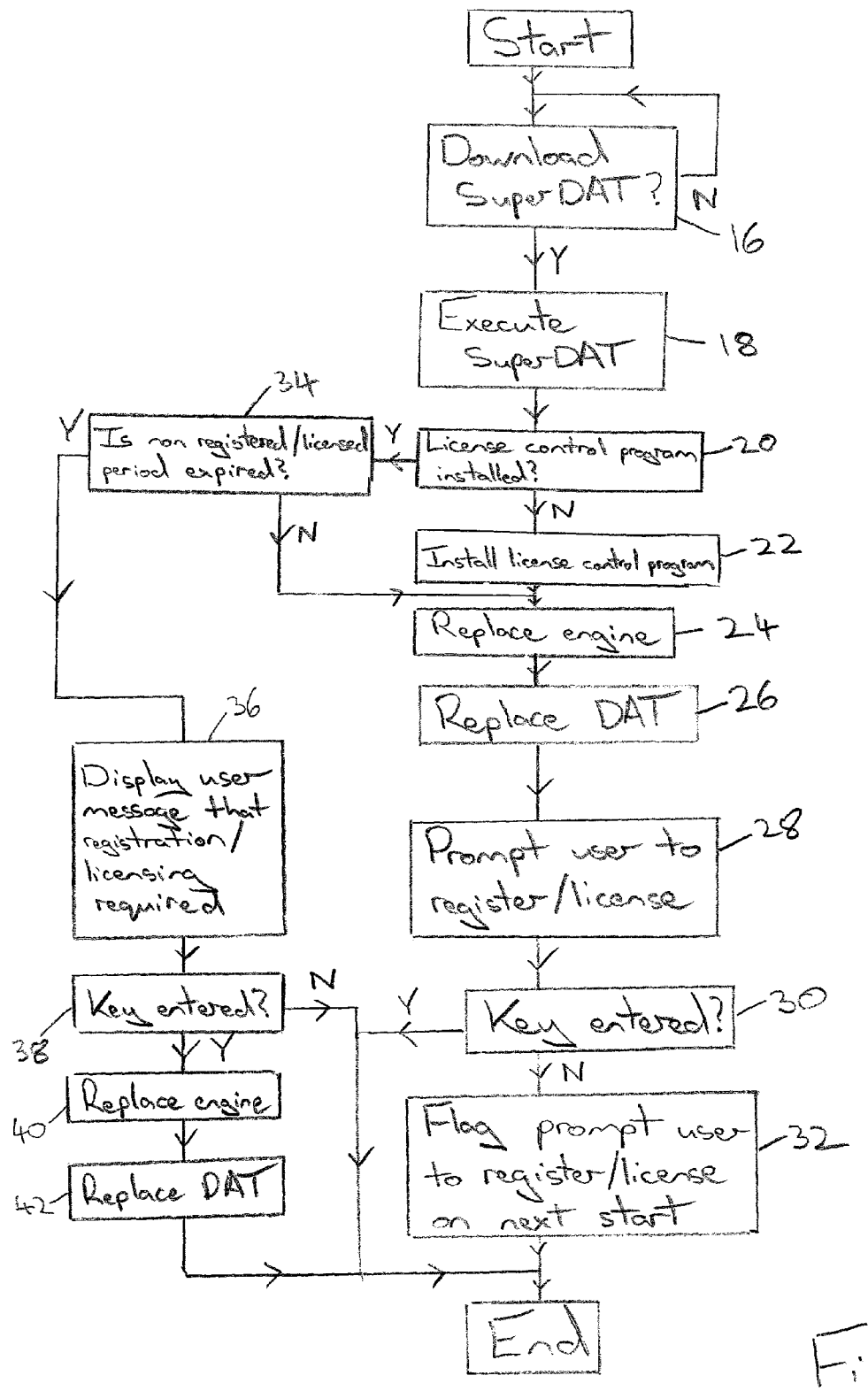
FIG. 2 is a flow diagram schematically illustrating the installation of a product update.

FIG. 2 schematically illustrates a flow diagram showing the action of a product update which adds a licensing control mechanism. At step 16 the system waits until a product update (SuperDAT) is downloaded, typically via a network connection through the internet from the computer program provider's web server. When the product update has been downloaded, then it is executed at step 18. Step 20 serves to check whether the licensing control program is already installed on the computer to which the product update is being applied. If the licensing control program is not already installed, then processing proceeds to step 22 at which the licensing control program is installed. Processing then proceeds to step 24 where the malware scanner engine is replaced and step 26 where the malware definition data is replaced. It will be appreciated that in different product updates it may be that only one of the scanner engine or malware definition data is replaced or updated. It is also possible that the product update may not make changes to the scanner engine or malware definition data but may simply install the licensing controlled program where this is not already installed.

When the product update is installed, processing proceeds to step 28 at which the licensing control program is used to prompt the user to register the product and enter the licence key data. Step 30 determines the licence key data has been entered. If licence key data has not been entered, then step 32 sets a flag to prompt the user to enter this data at the next start of the malware scanning computer program.

If the test performed at step 20 indicated that the licensing controlled program was already installed, then processing proceeds to step 34 at which a check is made as to whether the maximum grace period during which the user is reminded to enter the licence key data has expired. If this period has expired and the licence key data has not been entered, then the rest of the product update will not be applied and instead the processing will proceed to step 36 at which a user message is displayed indicating that the computer program must be registered or licensed as indicated by entry of the required licence key in order that further product updates may be applied. If the licence key data is entered at this stage, then this is detected by step 38 and processing proceeds via step 40 and 42 to replace the scanning engine and malware definition data from the product update.

Figure 3:
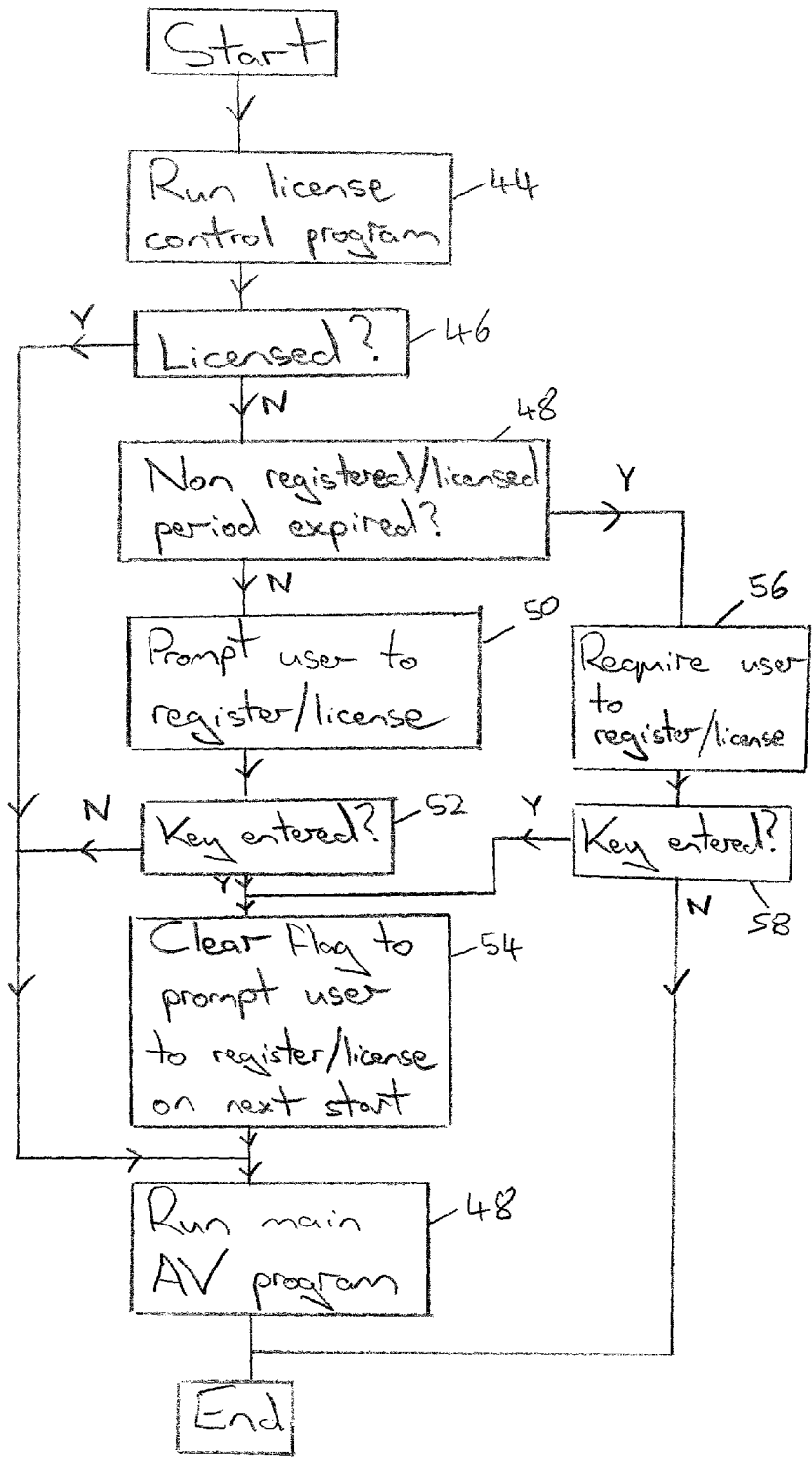
FIG. 3 is a flow diagram schematically illustrating the operation of a licensing control mechanism.

FIG. 3 illustrates the operation of the malware scanner once the licensing control mechanism has been installed. At step 44 the program is started and its first job is to run the licensing control program. Step 46 determines whether a valid licence key has already been entered in respect of this installation of the computer program. If a valid licence key has already been entered, then processing proceeds to step 48 at which the main malware scanner program is started and run.

If a licence key has not yet been entered, then processing proceeds from step 46 to step 48 at which a determination is made as to whether or not the grace period allowed for operation of the malware scanner with the licensing control mechanism installed and without licence key data entered has yet expired. A user may be given a period of, for example, thirty days during which they may obtain a licence key whilst continuing to be able to use the malware scanning computer program without the licence key in place. The licence control mechanism will store the date upon which it is installed and compare this with the current date in order to perform the determination indicated in step 48. The licence control mechanism may also have anti-tamper measures in place to prevent the user adjusting the dates to obtain an extended grace period.

If the grace period has not yet expired, then processing proceeds to step 50 at which the user is prompted to enter the licence key data. If this key data is entered, then step 52 detects this and directs processing to step 54 at which the flag is cleared indicating that a user prompt for the licence key need not be generated the next time that the computer program is started. If the licence key is not entered, then this flag is not cleared.

If the determination at step 48 was that the grace period has expired, then processing proceeds to step 56 at which a message is displayed to the user indicating that the user is required to enter licence key data before the program will start. If such licence key data is entered, then this is detected at step 58 and processing is directed to step 54 at which the flag is cleared indicating that the computer program is licensed. If the licence key data is not entered, then step 58 terminates processing without starting the main malware scanning program. It will be appreciated that in some situations it may be that the importance of providing effective malware protection means that a computer program provider will continue to allow the program to be run even if the grace period has expired either by way of an exceptional circumstance or as a general policy. This aspect of the configuration may also be dynamic in the sense that the computer program provider may by virtue of an update allow emergency continued use of the computer program even when the grace period has expired should a particularly damaging item of malware be prevalent as a matter of goodwill to unlicensed users.

FIG. 4 illustrates the updating of a malware scanner in accordance with the present technique. The existing installed malware scanner 60 has a scanner engine and malware definition data both at version level N. This malware scanner 60 is updated by the application of a product update (SuperDAT) to form an updated malware scanner 62 in which the scanner engine and malware definition data are both advanced to the version level (N+1) and a licence control mechanism and licence key data storage are also added.

Figure 5:
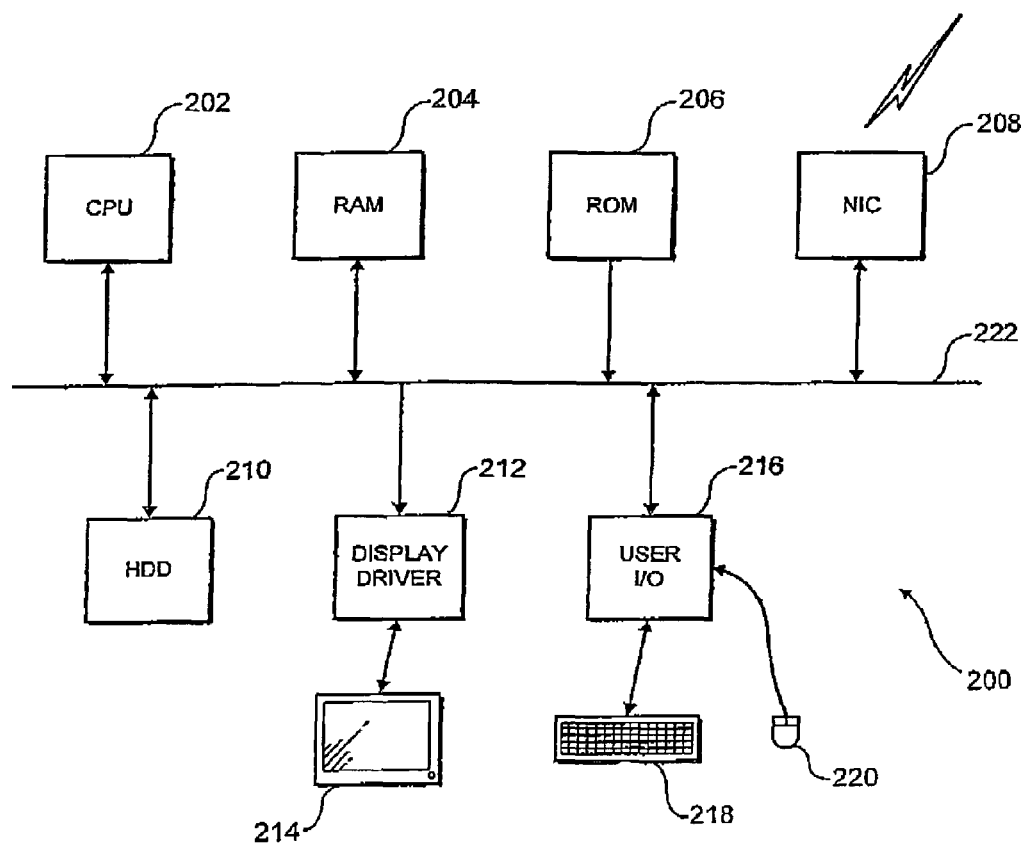
FIG. 5 is a diagram schematically illustrating the architecture of a general purpose computer that may be used to implement the above described techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a non-transitory computer readable medium, comprising:
a product update for a previously-installed computer program in a computer, wherein a determination is made whether a licensing control program separate from the previously-installed computer program was originally configured with said previously-installed computer program prior to installing said product update, wherein when the previously-installed computer program is configured without a licensing control program, installing a license control program, said licensing control program being responsive to license key data to indicate that said previously-installed computer program is licensed, wherein said previously-installed computer program is a malware scanning computer program and the product update includes at least one scanner engine and updated malware definition data that is updated automatically through a website download, that is added to existing malware definition data of the computer, and that is configured for detecting and addressing malware threats identified in network traffic, wherein the product update is not applied to the computer when it is determined that a grace period has expired and the license key data has not been entered, wherein the at least one scanner engine and the malware definition data is updated when the grace period has not expired and the license key data has not been entered, and wherein the previously-installed computer program is permitted to continue to be functional in the computer after the grace period in order to evaluate subsequent network traffic with the existing malware definition data.

2. A computer program product as claimed in claim 1, wherein said malware scanning computer program scans for at least one of:
computer viruses; worms; Trojans; banned files; banned words; and banned images.

3. A computer program product as claimed in claim 1, wherein malware scanning mechanisms of said malware scanning computer program are also modified by said product update.

4. A computer program product as claimed in claim 1, wherein said product update is downloaded via an internet connection from a provider of said previously-installed computer program.

5. A computer program product as claimed in claim 1, wherein said licensing control program is operable to request a license key to be entered each time said previously-installed computer program is started until said license key is entered.

6. A computer program product as claimed in claim 1, wherein said licensing control program is operable to disable said previously-installed computer program if a license key is not entered within a predetermined period.

7. A method, comprising:
receiving a product update at a computer;
determining whether a licensing control program was originally configured with a previously-installed computer program prior to installing said product update;
when the previously-installed computer program is configured without a licensing control program, installing a license control program; and
installing said product update on said computer in addition to said previously-installed computer program to modify said previously-installed computer program;
wherein said product update serves to add said licensing control program to said previously-installed computer program on said computer, said licensing control program being responsive to license key data to indicate that said previously-installed computer program is licensed;
wherein said previously-installed computer program is a malware scanning computer program and the product update includes at least one scanner engine and updated malware definition data that is updated automatically through a website download, that is added to existing malware definition data of the computer, and that is configured for detecting and addressing malware threats identified in network traffic, wherein the product update is not applied to the computer when it is determined that a grace period has expired and the license key data has not been entered, wherein the at least one scanner engine and the malware definition data is updated when the grace period has not expired and the license key data has not been entered, and wherein the previously-installed computer program is permitted to continue to be functional in the computer after the grace period in order to evaluate subsequent network traffic with the existing malware definition data.

8. A method as claimed in claim 7, wherein said malware scanning computer program scans for at least one of:
computer viruses; worms; Trojans; banned files; banned words; and banned images.

9. A method as claimed in claim 7, wherein malware scanning mechanisms of said malware scanning computer program are also modified by said product update.

10. A method as claimed in claim 7, wherein said licensing control program is operable to request a license key to be entered each time said previously-installed computer program is started until said license key is entered.

11. A method as claimed in claim 7, wherein said licensing control program is operable to disable said previously-installed computer program if a license key is not entered within a predetermined period.

12. An apparatus, comprising:
a memory for storing computer instructions to be executed by a processor of the apparatus for:
receiving a product update at a computer;
determining whether a licensing control program was originally configured with a previously-installed computer program prior to installing said product update;
when the previously-installed computer program is configured without a licensing control program, installing a license control program; and
installing said product update on said computer in addition to said previously-installed computer program to modify said previously-installed computer program;
wherein said product update serves to add said licensing control program to said previously-installed computer program on said computer, said licensing control program being responsive to license key data to indicate that said previously-installed computer program is licensed;
wherein said previously-installed computer program is a malware scanning computer program and the product update includes at least one scanner engine and updated malware definition data that is updated automatically through a website download, that is added to existing malware definition data of the computer, and that is configured for detecting and addressing malware threats identified in network traffic, wherein the product update is not applied to the computer when it is determined that a grace period has expired and the license key data has not been entered, wherein the at least one scanner engine and the malware definition data is updated when the grace period has not expired and the license key data has not been entered, and wherein the previously-installed computer program is permitted to continue to be functional in the computer after the grace period in order to evaluate subsequent network traffic with the existing malware definition data.

13. Apparatus as claimed in claim 12, wherein said malware scanning computer program scans for at least one of: computer viruses; worms; Trojans; banned files; banned words; and banned images.

14. Apparatus as claimed in claim 12, wherein malware scanning mechanisms of said malware scanning computer program are also modified by said product update.

15. Apparatus as claimed in claim 14, wherein said malware scanning computer program includes a scanner engine computer program operable to compare computer files to be scanned with malware definition data, at least one of said malware definition data and said scanner engine computer program being modified by said product update.

16. Apparatus as claimed in claim 12, wherein said licensing control program is operable to request a license key to be entered each time said previously-installed computer program is started until said license key is entered.

17. Apparatus as claimed in claim 12, wherein said licensing control program is operable to disable said previously-installed computer program if a license key is not entered within a predetermined period.

18. A computer program product as claimed in claim 1, wherein a message is provided to indicate that said previously-installed computer program must be licensed by entry of said license key data in order for product updates to be installed.

19. A computer program product as claimed in claim 6, wherein said predetermined period includes a period of time.

20. A computer program product as claimed in claim 6, wherein said predetermined period includes a number of starts of said previously-installed computer program.

21. A computer program product as claimed in claim 1, wherein a message is provided to indicate to enter said license key data before said previously-installed computer program will start.

* * * * *